United States Patent [19]

Bussonniere et al.

[11] Patent Number: 4,872,108
[45] Date of Patent: Oct. 3, 1989

[54] DEVICE HAVING MULTIPLEXER FOR ENABLING PRIORITY AND NON-PRIORITY COMMON CIRCUIT

[75] Inventors: André Bussonniere, Chatillon; Yves Courtois, Chilly Mazarin, both of France

[73] Assignee: U.S. Philips Corporation, New York, N.Y.

[21] Appl. No.: 159,817

[22] Filed: Feb. 24, 1988

[30] Foreign Application Priority Data

Feb. 27, 1987 [FR] France .................. 87 02659

[51] Int. Cl.[4] .................. G06F 9/46; G06F 13/00; G06F 13/18; G06F 15/16
[52] U.S. Cl. .................. 364/200; 364/228.1; 364/230.1; 364/242.7; 364/238
[58] Field of Search ... 364/200 MS File, 900 MS File

[56] References Cited

U.S. PATENT DOCUMENTS

| | | | |
|---|---|---|---|
| 4,096,571 | 6/1978 | Vander May | 364/200 |
| 4,189,766 | 2/1980 | Horiguchi et al. | 364/200 |
| 4,282,572 | 8/1981 | Moore, III et al. | 364/200 |
| 4,422,142 | 12/1983 | Inaba et al. | 364/200 |
| 4,594,657 | 6/1986 | Byrns | 364/900 |

Primary Examiner—Archie E. Williams, Jr.
Assistant Examiner—Emily Y. Chan
Attorney, Agent, or Firm—Thomas A. Briody; Jack E. Haken; Jack D. Slobod

[57] ABSTRACT

A priority processor (1) and a non-priority processor (20) cooperatively access a common memory (30) by means of an address multiplexer (40) which memory and multiplexer are controlled by a control unit (60). The priority processor issues data strobe (DSSN), clock (CLK) and write control (WSN) signals to the control unit to which the non-polarity processor also issues various memory access request signals. By forming a preparation signal (DSSN=0), the priority processor, through the control unit, claims the memory for a memory access cycle if a prior memory access request by the non-priority processor occurred less than about a clock cycle earlier.

16 Claims, 5 Drawing Sheets

DEVICE HAVING MULTIPLEXER FOR ENABLING PRIORITY AND NON-PRIORITY COMMON CIRCUIT

BACKGROUND OF THE INVENTION

1. Field of the Invention

The present invention relates to a data processing device including a first signal processing processor which is called a priority processor and which operates according to operating cycles, a second signal processing processor and a common circuit having at least a memory function and being connected to the first and second processor by means of a switching circuit, which switching circuit being controlled by a switching signal produced by a control unit, which switching signal produces, when it is at a first level, a connection to the first processor and when it is at a second level a connection to the second processor, which first processor being connected to the control unit and provided for generating a preparation signal and applying it to the control unit.

2. Prior Art

Such devices are well known. On this subject one can consult in particular the European Patent Application 0,021,287 which corresponds to U.S. Pat. No. 4,422,142. In this document, there is a description of a device in which the common circuit is a memory capable of being addressed by two data processing systems. These systems are constituted in the usual way on the basis of microprocessors. The device described in the above-mentioned patent application enables the avoidance of conflicts due to a simultaneous request from the two microprocessors relating to this common memory.

The known device is not very suited to the case in which the priority system must truly have priority over the other system in the use of this memory and this during the next operating cycle. This occurs when one of the systems includes a signal processing microprocessor operating according to fast cycles and when it is necessary to delay its operation as little as possible. The other system, having management functions can gain access to this common circuit with a less sustained frequency.

SUMMARY OF THE INVENTION

The present invention proposes a device which, to a large degree, resolves this problem of priority access to a common circuit for a data processing system operating in fast cycles.

For this purpose, such a device is characterized in that the control unit is provided to take the switching signal to its first level after receiving the preparation signal and to maintain the switching signal at its first level during the operating cycle which immediately follows the cycle during which the preparation signal was generated.

By maintaining the switching signal at its first level during this cycle immediately following that in which the preparation signal was generated, the obtained result is that the access to the common circuit is ensured during the said immediately following cycle.

A preferred embodiment of the device according to the invention is characterized in that the control unit is provided to delay an access to the common circuit, required by the second processor, to the operating cycle following that during which the switching signal was at its first level, when during a same operating cycle there was a preparation signal and an access request from the second processor which had been presented to the control unit. Thus a regular access for the second processor is ensured.

Another preferred embodiment of the device according to the invention is characterized in that there is provided an assembly of registers and three-state amplifiers in order to take control of the data coming from the common circuit and to restore them to the second processor while the switching signal is at its first level.

The invention also applies to a control unit provided to form the switching signal.

BRIEF DESCRIPTION OF THE DRAWING

The following description accompanied by the appended drawings, all given by way of non-limiting example, will give a good understanding of how the invention may be embodied.

DETAILED DESCRIPTION OF THE PREFERRED EMBODIMENT

Figure 1:
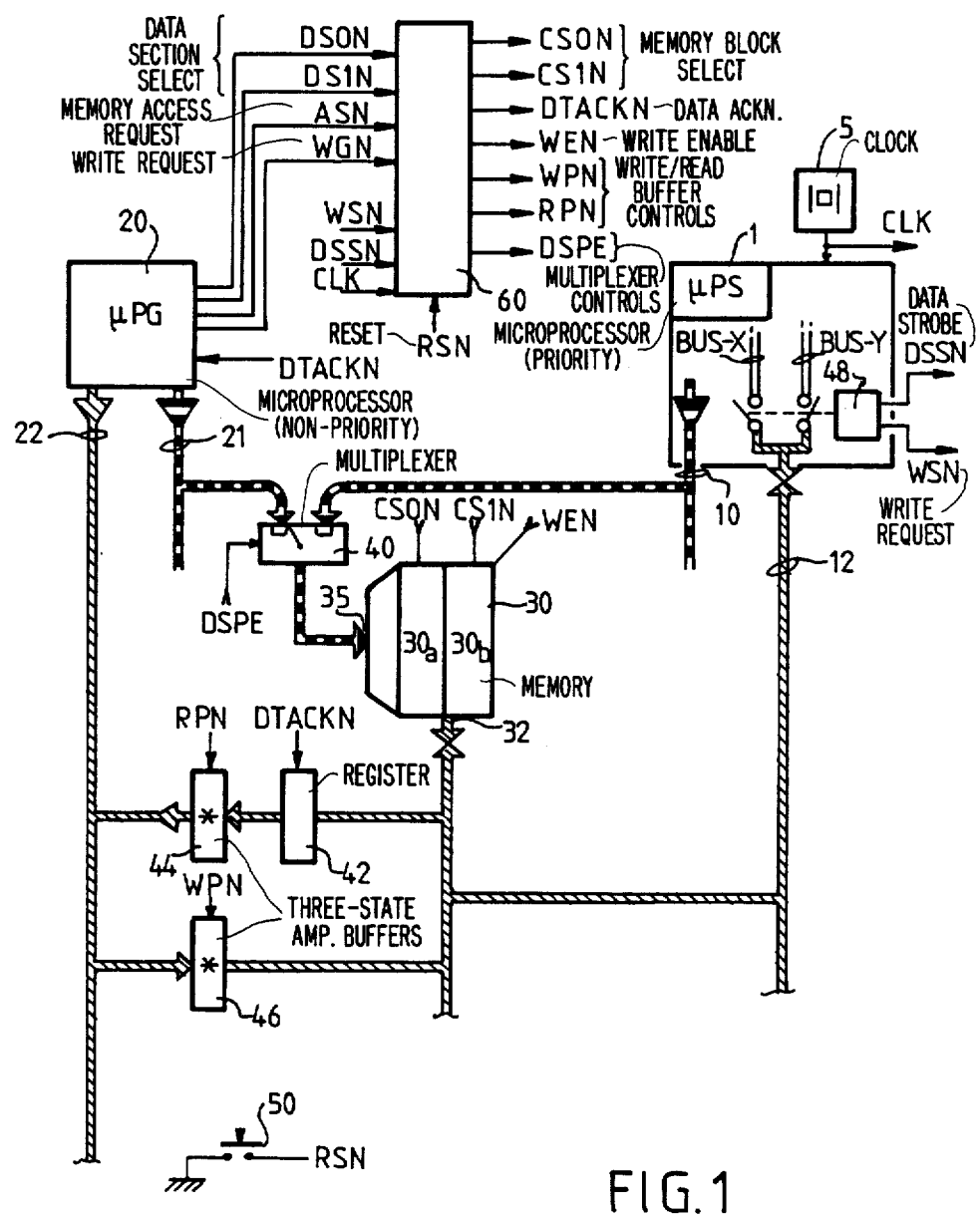
FIG. 1 shows a diagram of the device according to the invention.

FIG. 1 shows an example of a data processing device according to the invention. In this FIG. 1, the reference 1 indicates a signal processing microprocessor which is part of a priority signal processing system. This microprocessor, in the framework of the described example, is the microprocessor manufactured by Philips, with the reference number PCB 5010. This microprocessor functions in fast cycles whose repetition frequency is fixed by the signals CLK supplied by a clock 5. This microprocessor 1 supplies address codes on a common line 10 and can receive or transmit data on a common line 12. From this microprocessor 1, the signals DSSN and (the letter N indicating the inverse value of the signal) are output for signalling that the line 12 is connected to one of the internal common lines of the microprocessor (line X and line Y indicated in the specifications of the considered microprocessor) and that the data carried by the line 12 must be written to or read from the exterior.

The reference 20 in FIG. 1 indicates the microprocessor (for example the 68000) which is part of the second data processing system. This microprocessor which does not have priority with respect to the microprocessor 1 transmits address codes on a common line 21. A common data transmission line 22 is used for the exchange of data between the microprocessor 20 and its environment. This microprocessor also generates various signals in particular the signals DS0N and DS1N which indicate the section of the data to be taken into consideration and signify by this the size of the data. In fact, the microprocessor used in this example accepts words of 8 bits or words of 16 bits. It also supplies the signals ASN to indicate the validation of an address code present on the line 21 and the signals WGN to indicate that the data carried by the line 22 must be read or written. The reading or writing is ended by a signal DTACKN coming from a control unit 60.

A common circuit is constituted by a memory 30. This memory is organized as two blocks 31a and 30b corresponding to the size of the words processed by the microprocessor 20, each of these blocks being selected by means of signals CS0N and CS1N. A signal WEN coming from the control unit must be applied to the memory 30 in order to command a transfer direction of data present on its data access 32. The memory is also provided with an input 35 in order to receive address codes.

In order to switch this memory 30 on to one of the microprocessors 1 or 20, there is firstly used an address code switching circuit or multiplexer 40 such that the input 35 can be connected to the line 10 of the microprocessor 1 or to the line 21 of the microprocessor 20 depending on a switching signal DSPE produced by the control unit. In order to read the data from memory 30 by the microprocessor 20 there has been provided a succession of components formed by a register 42 and a set of three-state amplifiers 44 which interconnect the data or port 32 to the line 22. The record or latch control of the register 42 receives the signal DTACKN and the control for the transfer
state of the set of amplifiers receives a signal RPN.

For writing data coming from the microprocessor 20 into the memory 30 there is used a set of three-state amplifiers 46 interconnecting the line 22 with the data access 32. The control for the conducting state of this set receives a signal WPN.

The connection of the access 32 with the internal data line BUSX and BUSY of the microprocessor 1 is carried out inside this microprocessor under the control of the unit 48 which is intended to manage, under the control of the microprocessor operating program, the access by these X and Y buses to the external data line 12.

A reset-to-zero circuit 50, which has been shown in the figure in the form of a push-button, supplied a reset-to-zero signal RSN to the control unit 60.

Figure 2:
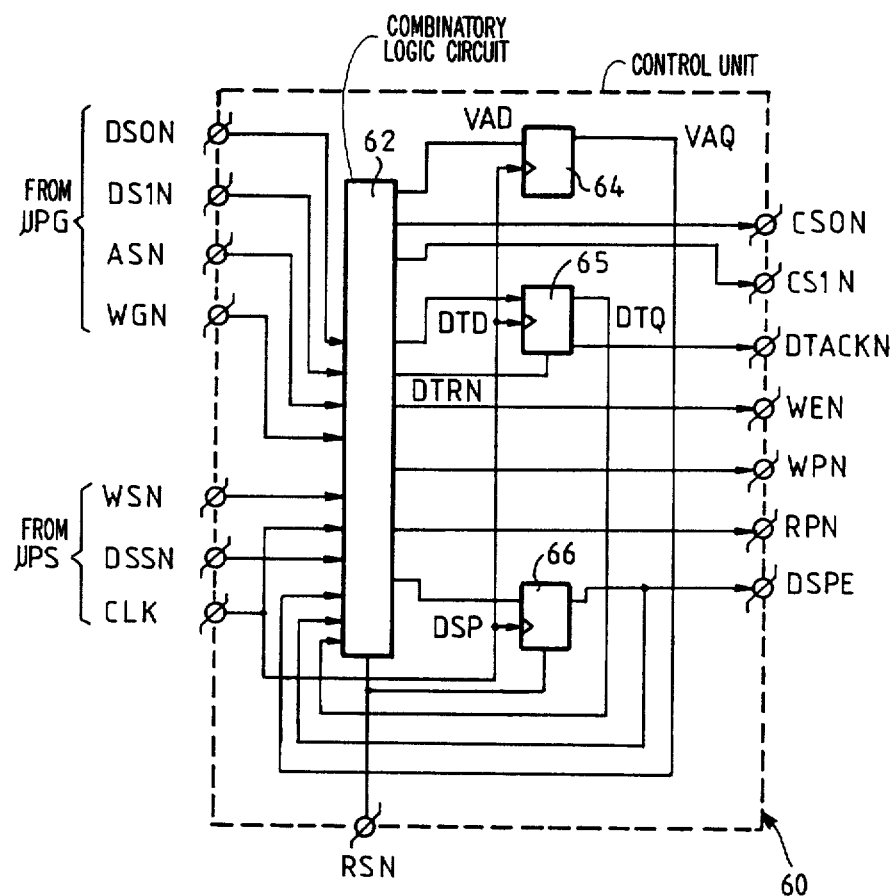
FIG. 2 shows a diagram of the control unit.

An example of a control unit 60 is shown in greater detail in FIG. 2. This control unit supplies the various signals CS0N, CS1N, DTACKN, WEN, WPN, RPN and DSPE from the signals DS0N, DS1N, ASN, WGN, WSN, DSSN, CLK and RSN.

This unit is composed of a combinatory logic circuit 62 and of three D-type flip-flops 64, 65 and 66. All these flip-flops receive the signal CLK on their clock input. The flip-flop 64 supplies at its output Q the signal VAQ while it receives on its D input the signal VAD. The flip-flop 65 supplies on its Q output the signal DTQ (=DTACK), receives on its D input a signal DTD and on its initialization input a signal DTRN. The flip-flop 66 supplies at its Q output the signal DSPE and receives on its D input a signal DSP and one its initialization input the signal RSN.

The combinatory circuit 62 receiving the signals DS0N, DS1N, ASN, WGN, WSN, DSSN, CLK, RSN, VAQ, DTQ and DSPE, supplies the signals VAD, CS0N, CS1N, DTD, DTRN, WEN, WPN, RPN and DSP by carrying out the following operations:

(1) VAD=/ASN.(/DS0N+/DS1N).RSN.(-/VAQ+DSPE)
(2) CS0N=DS0N./DSPE
(3) CS1N=DS1N./DSPE
(4) DTD=/VAD.VAQ.-/ASN(/DS0N+/DS1N).RSN+DTD./ASN.RSN
(5) DTRN=/ASN
(6) WEN=(WSN+/DSPE).(DSPE+/DTD+DTQ+ASN+DS0N.DS1N+WGN)
(7) WPN=DSPE+ASN+/DTD+DTQ+WGN+DS0N.DS1N
(8) RPN=/WGN+ASN+DS0N.DS1N
(9) DSP=/DSPE./DSSN.RSN

The relation DTACKN=/DTQ will be noted.

In order to write these different formulae, the following convention is used:

/: complement of the signal which follows
.: logic AND operation
+: logic OR operation Tables I and II below give the significance of the various signals.

TABLE I

| Logic signal | Active value | Comments |
|---|---|---|
| (1) SIGNALS COMING FROM THE MICROPROCESSOR μP G20 | | |
| DS0N | 0 | To select 8 least significant bits present on the line 22. |
| DS1N | 0 | To select 8 most significant bits present on the line 22. |
| ASN | 0 | To indicate that the memory 30 is being called. |
| WGN | 0 | To indicate a write request to memory 30 |
| (2) SIGNALS COMING FROM THE MICROPROCESSOR μP S1 | | |
| WSN | 0 | To indicate a write request to memory 30 |
| DSSN | 0 | On the one hand to serve as a preparation signal and on the other hand to indicate that a read or write entry in memory 30 is required. |
| (3) SIGNAL RSN | | |
| RSN | 0 | Set the flip-flops 64, 65 and 66 to zero on the next rising edge of the signal CLK. |
| (4) SIGNAL CLK | | |
| CLK | | Each rising edge of this signal controls an operating cycle of this device. |

TABLE II

| SIGNALS SUPPLIED BY THE CONTROL UNIT 60 | | |
|---|---|---|
| Logic signal | Active value | Comments |
| CS0N | 0 | To select the block 30a of the memory 30. |
| CS1N | 0 | To select the block 30b of the memory 30. |
| DTACKN | 0 | (a) To indicate to the processor PG20 that an entry or reading relating to memory 30 has been executed. |
| | 1 | (b) To make the register 42 transparent. |
| WEN | 0 | To set the memory 30 to the write condition. |
| WPN | 0 | To set the assembly 46 to the conducting state. |
| RPN | 0 | To set the assembly 44 to the conducting state. |
| DSPE | 1 | (a) To connect the input 35 to the line 10 (first level). |
| | 0 | (b) To connect the input 35 to the line 21 (second level). |

It is now possible to explain the operation of the device according to the invention. Firstly it is explained how a read and write in the memory 30 are carried out when these operations are required by the processor PG20, when it produces a signal ASN=0.

Figure 3:
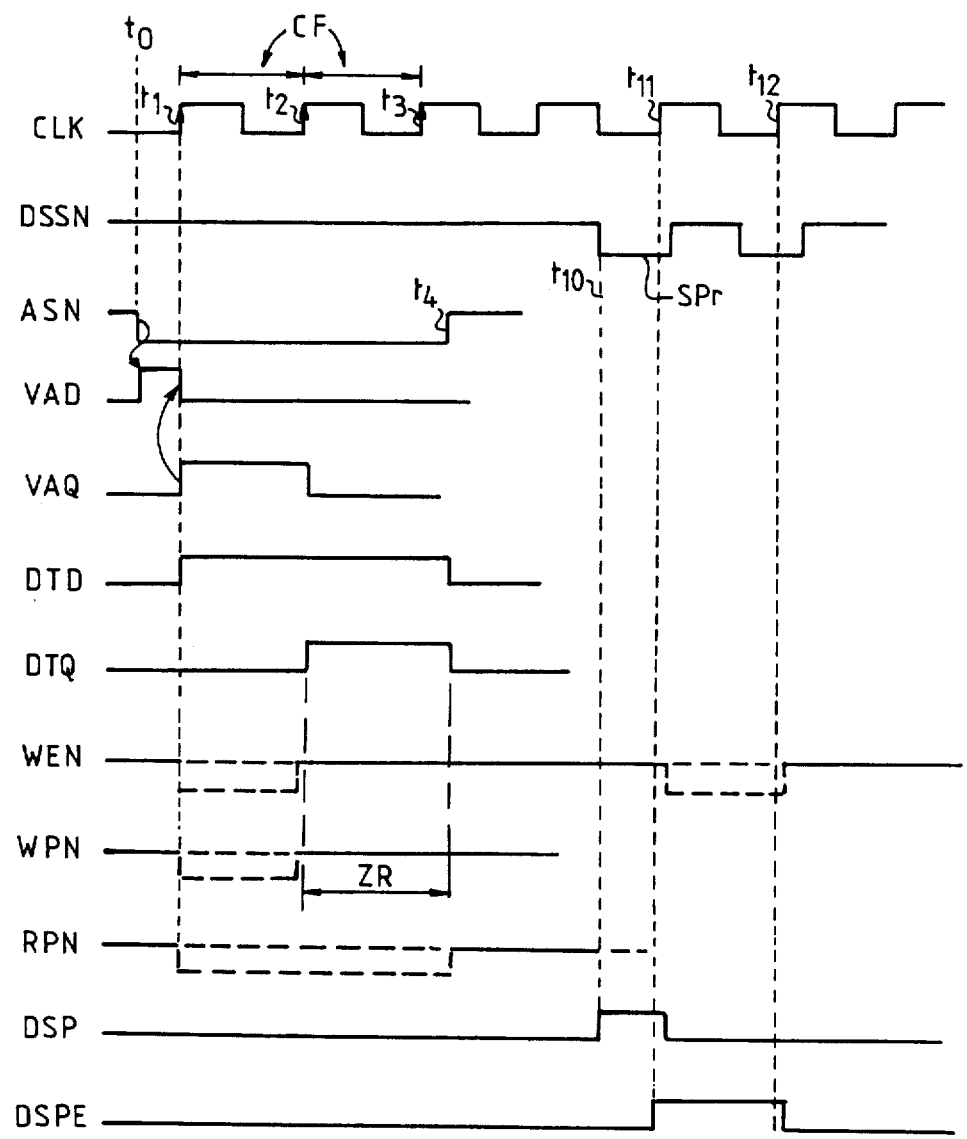
FIG. 3 shows a timing diagram intended to explain the operation of the device of the invention in the case where there is no conflict.

Referring to FIG. 3 where the time to is considered, it is at this time that the signal ASN becomes active (ASN=0) and it is not shown whether DS0N or DS1N also become active. Before this instant, the flip-flops are considered to be at zero, i.e.: VAQ=0, DTQ=0 and DSPE=0, which produces VAD=0. As soon as ASN has the value "0", VAD takes the values "1". Then, at time t1, a rising edge of the signal CLK occurs. At this time t1, as the signal VAD is equal to 1, the signal VAQ takes this value "1", which produces DTD=1 and VAD=0. At the time t2 the next rising edge of the signal CLK occurs, which makes VAQ take the value of VAD and DTQ become equal to "1". At the time t3 at which the third rising edge of the signal CLK occurs, the values of the signals remain unchanged. Then, finally, at the time t4 the signal ASN takes the value "1", again which resets the flip-flop 65 to zero, and therefore DTQ returns to "0", and the state described prior to t0 is regained.

A datum coming from the microprocessor 20 is written (WGN=0) during the time when VAQ=1 (between t1 and t2) i.e. just before the signal DTQ (or DTACKN) becomes active, thus signalling that the writing has been carried out. In reading (WGN=1) the signal RPN is active, in practice as long as the signal ASN is, which is not disadvantageous as the data coming from the memory 30 are stored during the time in which the signal DTQ (DTACKN) is active and it is during this time period, referenced ZR in this FIG. 3 (and also in FIGS. 4 and 5) that the datum at the output of the assembly 44 will be considered by the processor 20.

It is explained below how a read and how a write operation of the memory 30 are carried out when this is required by the processor 1.

The starting point is the time t10 at which the signal DSSN takes the value "0" thus constituting the preparatory signal indicated by SPr. It is assumed, according to the specifications of the signal processor envisaged, that this can only occur when the signal CLK has the value "0". The value "0" of DSSN causes the signal DSP to take the value "1", such that at the time t11 at which a rising edge of CLK occurs, the flip-flop 66 switches and DSPE takes the value "1" thus switching the memory 30 on to the processor 1 such that during the operating cycle CF situated between t11 and t12 (times at which rising edges of the signal CLK occur) the processor must carry out an access to the memory 30. The changing of DSSN to "1", after the time t11 produces DSP=0 since now DSPE=1, thus also when DSSN returns to the value "0", before t12, the fact that DSPE=1, prevents DSP from returning to the value "1". After the time t12, the signal DSPE returns to the value "0", since DSP is still at "0".

Figure 4:
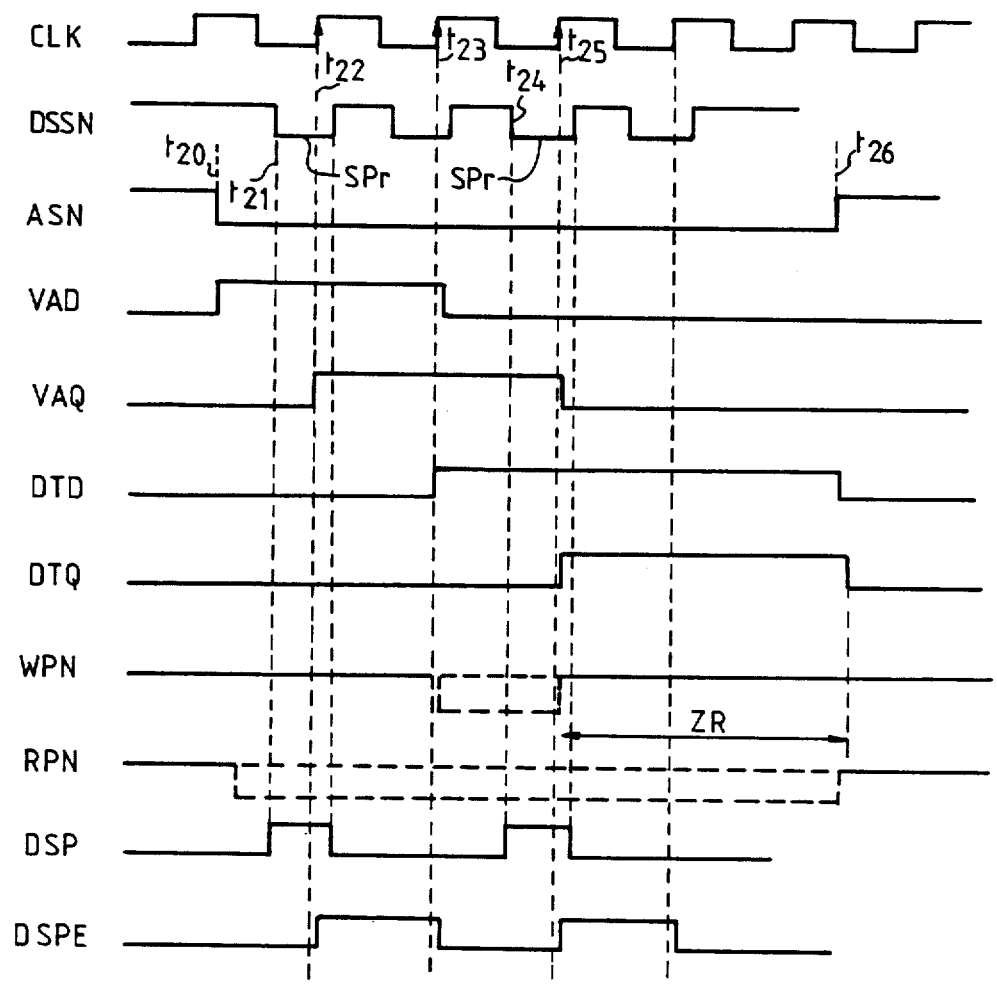
FIG. 4 shows a first timing diagram wherein the conflicting preparation signal occurs relatively early.

FIG. 4 shows a timing diagram wherein the preparatory signal, DSSN=0, occurs relatively early, in particular, in the next half clock period after ASN has become active. The fact that the signal ASN becomes active causes the change to "1" of the signal VAD. The signal DSP takes the value "1" under the effect of the signal DSSN=0 occurring at the time t21. At the rising edge of the signal CLK occurring at the instant t22, on the one hand the signal VAQ takes the value "1" and, on the other hand, the signal DSPE will also take this value in order to connect the memory 30 to the processor 1. Between the times t22 and t23, (determined by the rising edges of CLK) the signal DSPE will retain the value "1", which means that the signal VAD will also retain the value "1", this being due to the term (/VAQ+DSPE) of the equation (1). At the time t23, the signal DSPE takes the value "0" such that this time the signal VAD takes the value "0", the signal VAQ retains the value "1" since VAD has taken the value "0" after the rising edge of t23, and the signal DTD takes the value "1" just after the rising edge of this time t23, following the value VAD=0. An access to the memory 30 by the microprocessor 20 is now possible during the time in which VAQ remains equal to "1". Thus this access by the microprocessor 20 is delayed until the access by the microprocessor 1 is completed.

Then a second preparatory signal SPr occurs at the time t24. It is noted that this signal is produced while the signal DSPE has the value "0", implying that the memory 30 is connected to the microprocessor 20 in a way which will be explained a little later. This latter preparatory pulse SPr has the effect of setting the signal DSPE to "1" at the time t25 corresponding to a rising edge of the signal CLK. But this rising edge at the time t25 causes the change of the signal DTQ to "1" since DTD still has the value "1". This signal will only change to "0" when the signal ASN takes the value "1" (at the time t26), thus signifying that the exchanges between the microprocessor 20 and the memory 30 are completed.

Thus, as the signal DSPE has taken the value "1" between on the one hand the times t22 and t23 and on the other hand after the time t25 for one operating cycle duration, the exchanges between the priority microprocessor 1 and the memory 30 have been ensured. As regards the connections between the microprocessor 20 and the memory 30, it is appropriate to note that the writing of memory 30 could have taken place while the signal WPN had the value "0", i.e. between the times t23 and t25, while the reading could have taken place while the signal DTQ had the value "1" no matter what the value of DSPE may have been due to the register and the assembly 42 and 44.

Figure 5:
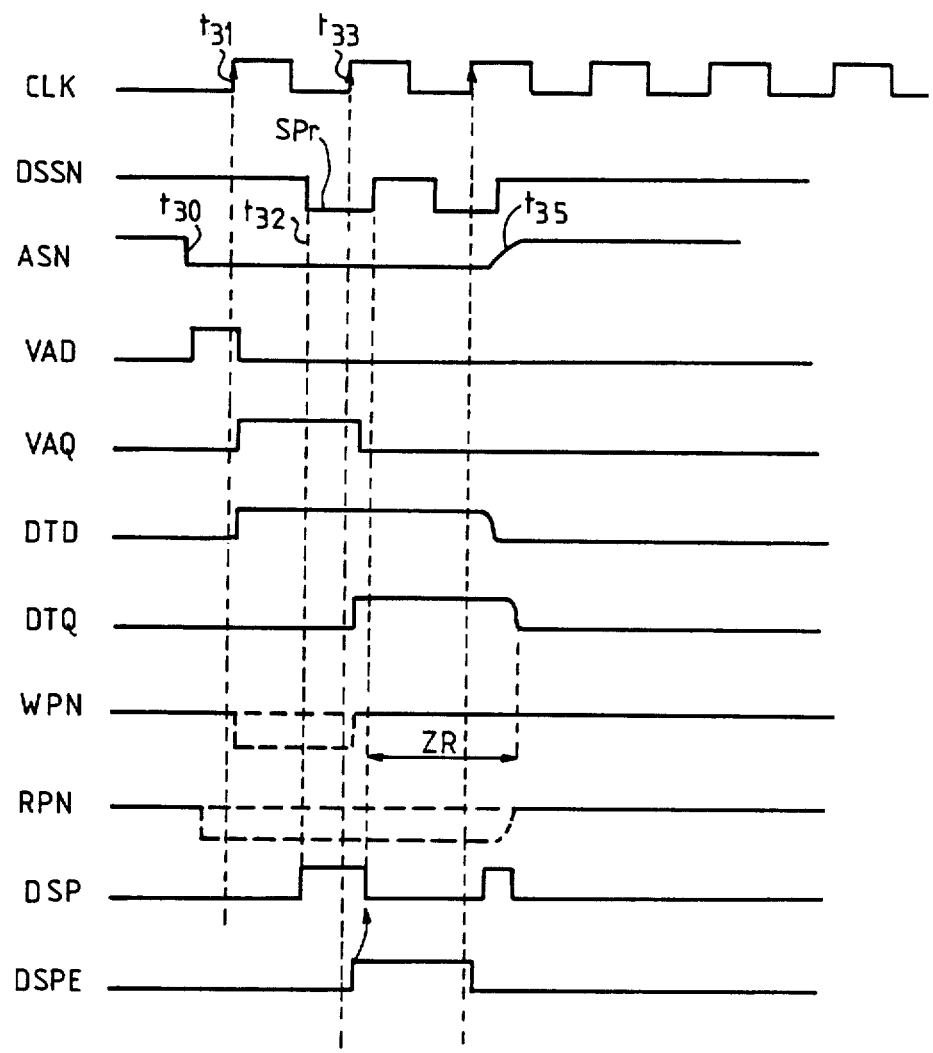
FIG. 5 shows a second timing diagram wherein the conflicting preparation signal occurs relatively late.

FIG. 5 shows a timing diagram wherein the preparatory signal occurs relatively late, in particular, in the next half clock period after ASN has become active. The process runs in the way already described with reference to FIG. 3. It is appropriate to note that when the signal DSPE takes the value "1" at the time t33 placing the microprocessor 1 in connection with the memory 30, the signal DTQ takes the value "1", which enables the microprocessor 20 to be able to read the data through the assembly and register 42 and 44, the writing having taken place if requested before the instant t33. At the time t35, the signal ASN takes the value "1" which completes the exchange.

What is claimed is:

1. A data processing system comprising:
   a common memory having a data connection and an address;
   a non-priority processor provided with a first address output, a first external data path coupled to the data connection of said memory, and a first control output for a first memory request signal;
   a priority processor provided with a second address output, a second external data path coupled to the data connection of said memory, and a second output for a preparation signal in conjunction with each intended memory access by said priority processor;
   a clock means for recurrently outputting a sequence of clock signals;
   a 2-to-1 multiplexer fed by said first and second address outputs and having a control input and a multiplexer output, feeding the address input of said memory;

a control unit fed by said first and second control outputs and by said clock means for under control of said first memory request signal in isolation generating a first multiplexer control signal coupled to said control input for causing said multiplexer to connect said first address output to said multiplexer output for executing a non-priority memory cycle to exchange data through said first external data path but for under control of said preparation signal irrespective of any said first memory request signal having occurred within a predetermined time interval before occurrence of said preparation signal generating a second multiplexer control signal coupled to said control input for then causing said multiplexer to connect said second address output to said multiplexer output, for executing a priority memory access cycle to exchange data through said second external data path.

2. A data processing system as claimed in claim 1, wherein said predetermined time interval starts with a first type clock signal edge, and said priority memory access cycle starts with the next following first type clock signal edge after occurrence of said preparation signal.

3. A data processing system as claimed in claim 2, wherein said clock signal has alternating first and second type clock signal edges.

4. A data processing system as claimed in claim 2, wherein said predetermined time period encompasses at most one whole clock signal cycle.

5. A data processing system as claimed in claim 1, wherein said common memory has a write enable input, said non-priority processor has a first write signal output, said priority processor has a second write signal output, and said control unit has write signal gating means for, in conjunction with a non-priority or priority memory access write cycle, gating said first or said second write signal respectively to said write enable input.

6. A data processing system as claimed in claim 1, wherein said control unit comprises delay means for under control of said first memory request signal having occurred in said predetermined time interval delaying generating said first multiplexer control signal until termination of said priority memory access cycle.

7. A data processing system as claimed in claim 1, wherein said first external data path has register means followed by three-state amplifier means for, upon execution of said non-priority memory access cycle, temporary buffering a data item received from said memory.

8. A data processing system as claimed in claim 5, wherein said control unit comprises delay means for under control of said first memory request signal having occurred in said predetermined time interval delaying generating said first multiplexer control signal until termination of said priority memory access cycle.

9. A data processing system as claimed in claim 5, wherein said first external data path has register means followed by three-state amplifier means for, upon execution of said non-priority memory access cycle, temporary buffering a data item received from said memory.

10. A data processing system as claimed in claim 8, wherein said first external data path has register means followed by three-state amplifier means for, upon execution of said non-priority memory access cycle, temporary buffering a data item received from said memory.

11. A data processing system as claimed in claim 2, wherein said control unit comprises delay means for under control of said first memory request signal having occurred in said predetermined time interval delaying generating said first multiplexer control signal until termination of said priority memory access cycle.

12. A data processing system as claimed in claim 3, wherein said control unit comprises delay means for under control of said first memory request signal having occurred in said predetermined time interval delaying generating said first multiplexer control signal until termination of said priority memory access cycle.

13. A data processing system as claimed in claim 4, wherein said control unit comprises delay means for under control of said first memory request signal having occurred in said predetermined time interval delaying generating said first multiplexer control signal until termination of said priority memory access cycle.

14. A data processing system as claimed in claim 2, wherein said first external data path has register means followed by three-state amplifier means for, upon execution of said non-priority memory access cycle, temporary buffering a data item received from said memory.

15. A data processing system as claimed in claim 3, wherein said first external data path has register means followed by three-state amplifier means for, upon execution of said non-priority memory access cycle, temporary buffering a data item received from said memory.

16. A data processing system as claimed in claim 4, wherein said first external data path has register means followed by three-state amplifier means for, upon execution of said non-priority memory access cycle, temporary buffering a data item received from said memory.

* * * * *